P. CURRY.
COMBINED DOOR JOINT PROTECTOR AND NAME PLATE FOR AUTOMOBILES.
APPLICATION FILED SEPT. 12, 1921.

1,398,586.

Patented Nov. 29, 1921.

INVENTOR:
PATRICK CURRY.
BY: *Clarence J. Loften*
ATT'Y.

UNITED STATES PATENT OFFICE.

PATRICK CURRY, OF CHICAGO, ILLINOIS.

COMBINED DOOR-JOINT PROTECTOR AND NAME-PLATE FOR AUTOMOBILES.

1,398,586.  Specification of Letters Patent.  Patented Nov. 29, 1921.

Application filed September 12, 1921. Serial No. 499,997.

*To all whom it may concern:*

Be it known that I, PATRICK CURRY, residing at Chicago, in the county of Cook and State of Illinois, have invented a certain new and useful Combined Door-Joint Protector and Name-Plate for Automobiles, of which the following is a specification.

Due to the strains and stresses which the body of an automobile is subject to in the ordinary use, an appreciable space or gap soon develops between the swinging end of the door and the door frame or body of the automobile. After such a condition has arisen the edge of the door and adjacent portion of the body of the automobile has a tendency and does close up or pinch together under strains and stresses, as a result of which the occupants of the car frequently have their hands or arms, particularly when resting on the edge of the body, pinched between these two parts by this action. This objection is especially prevalent in connection with the front door on the driver's side, as most drivers rest, continuously while driving, one arm over the edge of the body and it is usually directly above the joint between the door and the door body. It is therefore an object of my invention to provide a device, simple, inexpensive and of durable construction, which will entirely eliminate all probability of this pinching action, even though the door may be sprung considerably away from the edge of the adjacent body portion.

It is a further object to provide such a device which can be readily and quickly attached to any of the standard bodies at the factory or elsewhere.

It is a further object to provide such a device so arranged that a portion of it may be used for a name plate.

The above and other features of novelty, advantages and capabilities will become apparent from a detailed description of the accompanying drawings, in which I have illustrated one form of my invention, but the construction there shown is to be understood as illustrative and not as defining the limits of my invention.

Figure 1:
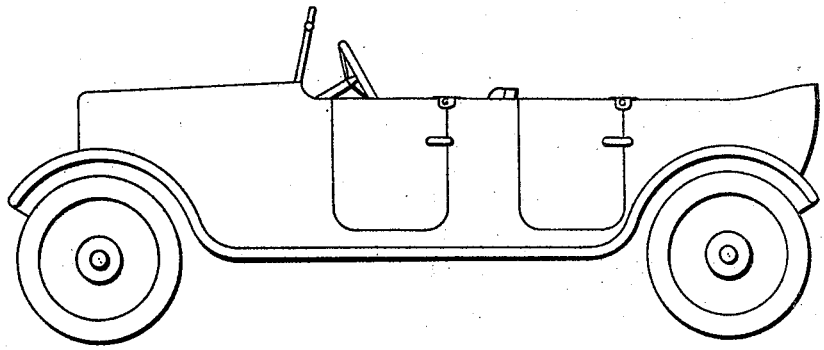
Figure 1 is a side elevational view of any ordinary automobile showing a combined door joint protector and name plate for automobiles, embodying one form of my invention applied.
Figure 3:
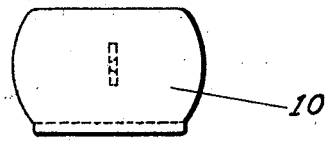
Fig. 3 is a top plan view of the device.
Figure 2:
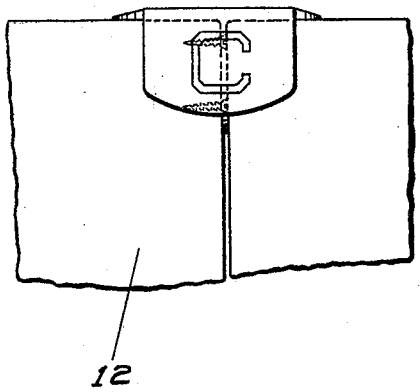
Fig. 2 is an enlarged elevational view of the same, showing a fragmentary portion of the door and body.
Figure 4:
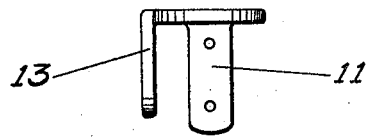
Fig. 4 is an end elevational view of the same.

Referring to the drawings in detail, the device may be stamped or molded in one piece from nickel, aluminum or other metal composition or from a rubber composition. In the particular form shown the device is constructed of rubber, which comprises a top main portion 10 which in practice will be from two to three inches long, which portion is provided with a downwardly extending integral lug 11, provided with openings through which openings screws or the like are inserted for fastening the protector to the vertical edge of a swinging door 12, near the upper end thereof. The portion 10 near its outer edge is provided with a downwardly extending flange 13 which flange, when in position, is on the outside of the car body, and is adapted to carry a monogram, name or such initials as may be desired. In the particular instance shown it carries the initial "C." The lower end of the flange 13 is circular in form to add to the appearance and eliminate any sharp corners which might be objectionable. The portion 10 of the protector likewise has circular ends as best shown in Fig. 3 which are beveled as shown in Fig. 2, so that the arm or hand of the occupant of the car may slide readily and easily over the protector.

From this it will be seen that I have produced a simple, compact, inexpensive and efficient protector for the purpose intended, and that it will entirely eliminate the pinching of the hand or arms of the occupants of the car between the door and door frame or body of the car. In addition the protector serves the function of a non-rattler, that is, it prevents the door rattling after it has become loose in use which all doors do. The main function, of course, of the downward extending flange 13 is to prevent the ends of the fingers of the occupant when the hand is gripped over the edge of the body, from being pinched in the vertical joint between the door and body, when such parts are abruptly moved together under the ordinary strains and stresses set up in use. However, as before stated, it has an additional function in that it can be utilized for carrying any desired monogram, initials or name.

Having thus described my invention, I claim:

1. In a device of the class described, the combination of an automobile body having a swinging door, a door joint protector, secured to said door near its upper swinging end, and adapted when the door is closed, to bridge the joint between the door and body and overlap a substantial portion of the body near the door opening, said protector having a downwardly extending portion co-extensive therewith on the outside of the door and means for rigidly securing said protector to said swinging door, substantially as and for the purposes described.

2. A combined joint protector and name plate for automobile bodies provided with a swinging door, comprising a main portion adapted to be secured to the upper edge of a swinging door, and designed to bridge the joint between the door and body and overlap the upper edge of the door and automobile body adjacent thereto, a downwardly extending flange substantially co-extensive with such main portion adapted to engage the door and body on the outside when the door is in closed position and means for securing the main portion to the door.

3. A combined joint protector and name plate for automobile bodies provided with a swinging door, comprising a main portion adapted to be secured to the upper edge of a swinging door, and designed to bridge the joint between the door and body and overlap the upper edge of the door and body, a downwardly extending flange substantially co-extensive with the main portion adapted to engage the door and body on the outside when the door is in closed position and means for securing the main portion to the door, said means comprising a downwardly extending integral lug provided with openings and adapted to engage the vertical edge of the door near the upper end thereof.

4. In a device of the class described the combination of an automobile body having a swinging door, a combined door joint protector and name plate for said body comprising a main portion adapted to be positioned on the upper edge of said door having an outwardly extending portion adapted to engage and overlap the body adjacent to said door and to span the joint between said parts, a downward extending flange substantially co-extensive with said main portion adapted to be positioned on the outside of the door and overlap the door and body and span the joint therebetween and means for securing said protector to the swinging door.

In witness whereof, I hereunto subscribe my name to this specification in the presence of two witnesses.

PATRICK CURRY.

Witnesses:
K. A. HARGADEN,
CLARENCE J. LOFTUS.